April 20, 1937.   R. NIEDERSTRASSER   2,077,641

PROCESS FOR CONNECTING PIPES

Filed Oct. 6, 1936

INVENTOR
RICHARD NIEDERSTRASSER
BY O. V. Thiele
ATTORNEY

UNITED STATES PATENT OFFICE 2,077,641

PROCESS FOR CONNECTING PIPES

Richard Niederstrasser, Mulheim-Ruhr, Germany, assignor to Schmidt'sche Heissdampf-Gesellschaft, m. b. H., Wilhelmshohe, Germany Application October 6, 1936, Serial No. 104,162
In Germany October 15, 1935

4 Claims. (Cl. 29—157.6)

The invention relates to a process for connecting the ends of two or more parallel tubes to each other by means of a structure unitary with them. Tube connections of this sort are now manufactured by a known process, the tubes after having been suitably heated and placed in a suitable die being slit from the ends inwardly by introducing a plunger, the portions adjacent to the slit being forced outward and the edges adjacent to the slit in one pipe becoming welded to those of the other. The process is fully described in a number of prior patents, e. g. United States. Patent 1,169,209, True et al. In case the distance between the two tubes is small and the gauge of the tubes relatively heavy, certain difficulties may arise in this method from the fact that too much material piles up ahead of the plunger and causes it to bind or jam. When the tube diameters are larger and the gauge is relatively small, these difficulties do not occur. In such cases, however, it has been found that the pressure of the plunger pushes the material of the wall in the region of the crotch forward so that folds from and the weld is unsatisfactory.

The subject matter of the present invention is a process which will make it possible to connect tubes even in such cases without folding and without resulting in unsatisfactory welding at any point. This new process consists in slitting the ends of the pipes before they are put into the die up to a point adjacent to where the crotch is to be formed so that all that remains for the plunger to do in order to form the connecting structure is to bend the portions adjacent to the slits outward and to weld their edges together. The slit can be made by any desired means, e. g. by sawing or by means of a torch. It has proved advantageous to give the slit a form such that it becomes progressively wider from the end inward. A satisfactory weld will result between the abutting edges of the portions as well as at the crotch, the latter becoming somewhat thickened or upset.

In the drawing there is shown at Fig. 1 a pipe end with a slit made in accordance with the invention;

Fig. 3 shows it at the end of its stroke;

Figure 1:
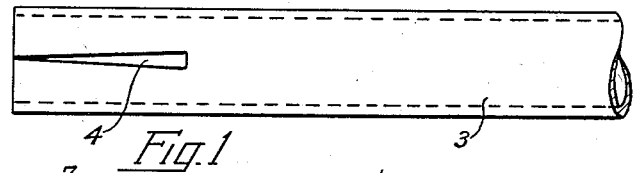
Figure 2:
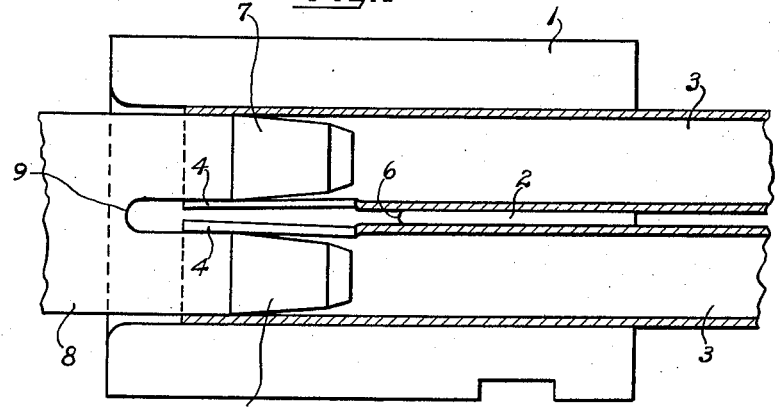
Figs. 2 and 3 show the lower half of a die with the pipe ends (in section) in place, Fig. 2 showing it after the plunger has been inserted but before it begins its actual operation.
Figure 3:
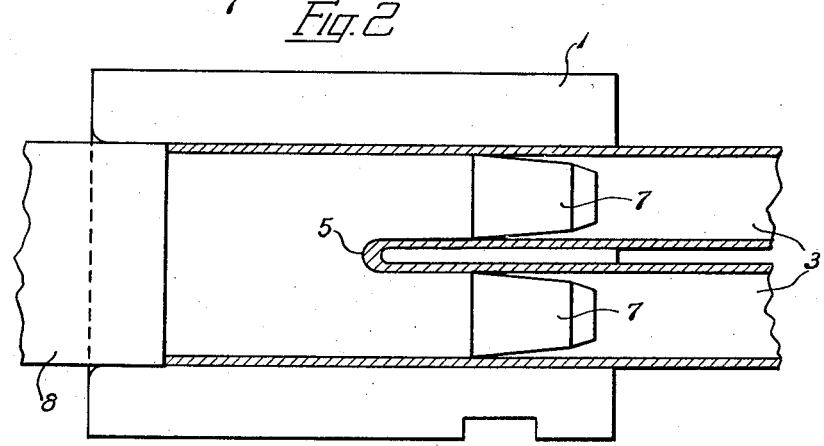
Figure 4:
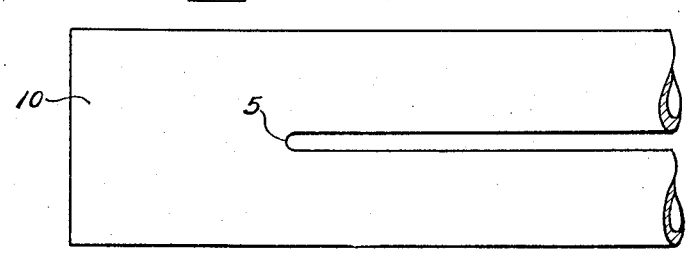
Fig. 4 shows a "breeches piece" made in accordance with the invention.

The die halves 1 are shaped as usual with two semi-cylindrical grooves separated by a wall 2, the tube ends 3 being placed in the semi-cylindrical grooves. The tube ends 3 are placed in such a position that the slits 4 face each other. The slits widen from the edge of the tube inward so that they form an acute angled triangle with a small base. They terminate a little distance short of the point at which the crotch is to be located in the completed structure. This will be clear from Fig. 2, where it will be noted that the slits 4 do not extend quite to the point 6 where the wall 2 terminates. The plunger 8 with its two branches 7 must, during the first part of its stroke, bend outward the portions adjacent to the slits and weld them together. Toward the ends of its stroke the plunger comes into contact with its throat 9 with the portions of the wall adjacent to the base of the slit 4 and bends them outward, welding them together and forming the crotch 5. The material adjacent to the crotch is thereby somewhat upset or thickened and the two opposing edges will weld together without difficulty, and no crumpling or folding occurs even when the tubes have relatively thin walls. After the so-called "breeches piece" is thus finished its open end 10 can be operated on in any desired manner, for instance, it may be rounded in a cylindrical form for connection to a third pipe, or it may be closed by suitable means to form a return bend.

What I claim is:

1. In the art of connecting relatively thin-walled pipes to each other the process comprising the steps of first slitting each of two pipes to be connected inwardly from its end, thereafter heating them to a suitable temperature, and, while holding the pipes in the relative position they are to occupy in the finished structure, bending the portions adjacent to each slit outwardly causing their edges to abut and to become welded to each other.

2. The process according to claim 1, the slits terminating at a point short of that where the crotch will be located in the finished piece.

3. The process according to claim 1, the slits widening progressively from the end inward.

4. The process according to claim 1, the slits widening progressively from the end inward and terminating at a point short of that where the crotch will be located in the finished piece.

RICHARD NIEDERSTRASSER.